July 26, 1927.

C. H. SNYDER

PISTON PIN

Original Filed Oct. 26, 1925

1,637,247

Caleb H. Snyder, INVENTOR

BY Victor J. Evans ATTORNEY

WITNESS:

Patented July 26, 1927.

1,637,247

UNITED STATES PATENT OFFICE.

CALEB H. SNYDER, OF WINNSBORO, LOUISIANA.

PISTON PIN.

Application filed October 26, 1925, Serial No. 64,884. Renewed June 13, 1927.

This invention relates to improvements in mountings for piston or wrist pins and which contemplates the provision of a bushing arranged within the upper end of a connecting rod in order that three bearing surfaces are thus provided therefor in the process of full floating the piston or wrist pin therein.

Another object of my invention and for use in connection with the above entitled wrist pin is the provision of disks and split rings arranged within the wrist pin openings in a piston and engaging the opposite ends of the wrist pin when so arranged therein as to prevent the ends of the wrist pin from scoring the cylinder walls and preventing the oil thus collected upon the wrist pin which is slashed upwardly within the piston and through openings provided in the upper end of the connecting rod and wrist pin mountings for preventing the loss of oil and constantly keeping the wrist pin in a bath of oil.

With the above and other objects in view the invention further includes the following novel features and details of construction, to be hereinafter more fully described, illustrated in the accompanying drawing and pointed out in the appended claim.

In the drawing:—

Figure 1:
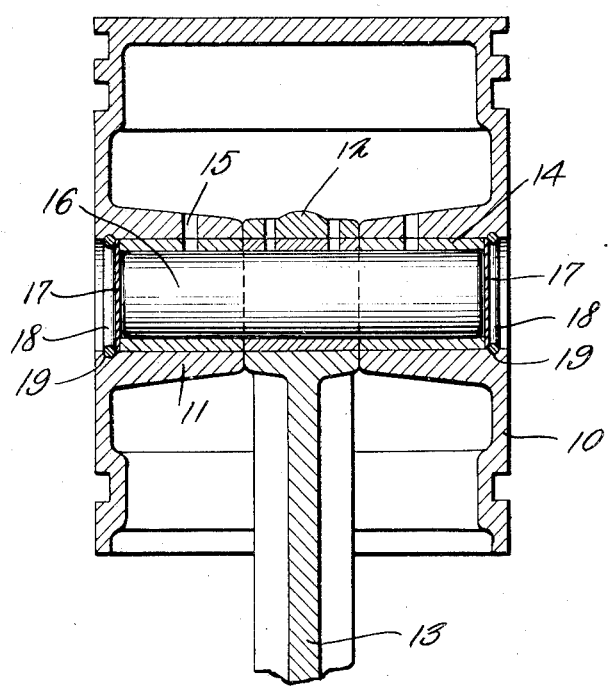
Figure 1 is a vertical sectional view taken through a piston with my wrist pin mounting and showing the arrangement of the disks and split rings thereon.
Figure 2:
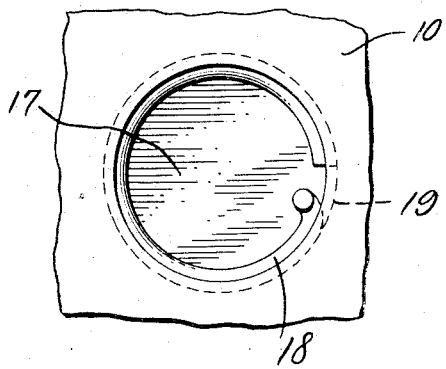
Figure 2 is a fragmentary side elevation of a piston and showing the relative arrangement of the disk and split ring arranged thereon.
Figure 3:
Figure 3 is a detail perspective of a split ring.
Figure 4:
Figure 4 is a similar view of a part of my disk.

Referring to the drawing in detail, wherein like characters of reference denote corresponding parts, the reference character 10 indicates a piston which may be of the usual or preferred type and including inwardly extending sleeves 11 from the opposite sides thereof and having their inner ends arranged in spaced relation to receive the upper end 12 of a connecting rod 13 therebetween; each of these sleeves 11 and the upper end 12 of the connecting rod 13 have bushings 14 mounted therein with oil inlet ports 15 arranged in registration in order that the oil thus splashed within the crank case of an automobile, not shown, may be deflected within the top of the piston 10 and drain into the oil port 15. It is to be understood that no clamping means is utilized upon the upper end 12 of the connecting rod 13, but the only means for associating the wrist pin 16 within the bushing and the bushings arranged within the sleeves 11 are disks 17 which are preferably constructed of copper or brass and which are arranged within the outer ends of the openings in the sleeves 11 and abutting the outer ends of the wrist pin 16 while split rings 18 are arranged within grooves 19 within the openings of the sleeves 11 in order that these disks 17 may be held rigidly in their respective positions and preventing the wrist pin 16 from endwise movement within the bushings 14 in order that the same will be prevented from scoring the cylinder walls and also to prevent the oil which drains within the oil ports 15 from draining from the piston pin or wrist pin 16 and in order that the same will always be mounted and supported within a bath of oil and thus eliminating any noises owing to its triple bearing surface upon the respective bushings 14 arranged in the sleeves 11 and upper end of the connecting rod 13.

The advantage that the floating piston pin has over the usual piston pin is that the floating piston pin being free and able to revolve and allowing the pin to wear evenly on all sides whereas the other pins only oscillate in the piston or the connecting rod oscillates on the pin and the pin soon wears out on the top side causing very noticeable knocks.

The invention is susceptible of various changes in its form, proportions and minor details of construction and the right is herein reserved to make such changes as properly fall within the scope of the appended claim.

Having described my invention what is claimed is:—

A wrist pin mounting of the character described comprising a piston having inwardly extending sleeves arranged within its inner sides and having their inner ends arranged in spaced relation, a connecting rod having a circular apertured upper end portion arranged between the inner ends of the sleeves, a plurality of bushings arranged within the sleeves and connecting rod and including registering oil ports therein for receiving the splashed oil, a pair of disks arranged at the opposite ends of the wrist pin within the bores of the sleeves, and split rings arranged immediately in advance of the disks for preventing their accidental displacement within the sleeve bores whereby the wrist pin will be floated within a bath of oil and preventing its end play whereby the cylinder walls of a motor may not be scored.

In testimony whereof I affix my signature.

CALEB H. SNYDER.